(12) United States Patent
Shor et al.

(10) Patent No.: US 9,479,374 B1
(45) Date of Patent: Oct. 25, 2016

(54) DIGITAL FRONT-END CHANNELIZATION DEVICE

(71) Applicant: FREESCALE SEMICONDUCTOR, INC., Austin, TX (US)

(72) Inventors: Roi Menahem Shor, Tel Aviv (IL); Frederic Paul Fernez, Fontenilles (FR); Avraham Dov Gal, Raanana (IL); Peter Zahariev Rashev, Calgary (CA)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/880,738

(22) Filed: Oct. 12, 2015

(30) Foreign Application Priority Data

May 12, 2015 (WO) .................. PCT/IB2015/000965

(51) Int. Cl.
*H04K 1/02* (2006.01)
*H04L 27/26* (2006.01)

(52) U.S. Cl.
CPC ................................. *H04L 27/2614* (2013.01)

(58) Field of Classification Search
CPC . H03F 1/3247; H04L 27/368; H04L 1/0003; H04L 1/0071; H04L 27/2614
USPC .................................. 375/296, 295
See application file for complete search history.

(56) References Cited

U.S. PATENT DOCUMENTS

| 7,072,411 | B1 | 7/2006 | Dollard |
| 8,428,179 | B1 | 4/2013 | Xu et al. |
| 8,548,085 | B2 | 10/2013 | McGowan et al. |
| 2011/0255627 | A1 | 10/2011 | Gotman et al. |
| 2011/0261896 | A1 | 10/2011 | Haddad |
| 2013/0195213 | A1* | 8/2013 | Fazlollahi ........... H04L 27/2614 375/267 |
| 2014/0044215 | A1 | 2/2014 | Mundarath et al. |

FOREIGN PATENT DOCUMENTS

WO 2004110009 A1 12/2004

* cited by examiner

*Primary Examiner* — Helene Tayong

(57) ABSTRACT

A digital front end channelization device for one or more carrier signals comprises a per carrier section and a composite section. The composite section may include signal processing units, each of which may include an inverse Fourier transform unit for transforming a composite carrier signal into a time domain signal, a sample detection and selection unit for detecting and selecting a peak of the time domain signal, a clipping unit for clipping the time domain composite carrier signal to produce an error signal, a Fourier transform unit, for transforming the error signal into a frequency domain error signal, a frequency shaping unit for frequency shaping the frequency domain error signal, a summation unit for subtracting the frequency shaped frequency domain error signal from the composite carrier signal, and a phase selection unit for phase adjustment of the resulting signal.

16 Claims, 5 Drawing Sheets

DIGITAL FRONT-END CHANNELIZATION DEVICE

CROSS REFERENCE TO RELATED APPLICATION(S)

The present application is related to co-pending U.S. Patent Application No. PCT/IB2015/000965, entitled "A DIGITAL FRONT-END CHANNELIZATION DEVICE," filed on 12 May 2015, the entirety of which is herein incorporated by reference.

FIELD OF THE INVENTION

This invention relates to a digital front end channelization device, a computer program product and a non-transitory tangible computer readable storage medium.

BACKGROUND OF THE INVENTION

Wireless communication devices, such as mobile devices and base stations, include signal processing functions that bridge the processing of one or more signals at baseband with the processing of the one or more signals at radio frequencies. These signal processing functions may be embedded in a so called digital front-end (DFE). The digital front-end may include a so-called channelization device, at least a sample rate conversion block and a digitization block. The channelization device can convert the one or more carrier signals from the baseband into radio frequency (RF), e.g. in a transmitter. Alternatively, the channelization device may convert the one or more carrier signals from RF to the baseband, e.g. in a receiver. Typically the channelization device also performs filtering, e.g. removal of adjacent channels interferers. The sample rate conversion block may convert a fixed clock rate into a target rate of a respective air interface, e.g. in a receiver. Alternatively, the sample rate conversion block may convert a target rate of a respective air interface into a fixed clock rate, e.g. in a transmitter.

Wireless communication devices also include transmitter and/or receiver circuits (i.e., transceivers) in which power amplifiers are used to amplify a signal before wireless transmission to another device. For example, base stations employing wideband digital communication transmitters will constructively add a plurality of carrier signals, resulting in multi-carrier signals each having a large peak-to-average power ratio (PAPR) which can adversely constrain the performance of high power amplifiers used to amplify the multi-carrier signal for transmission. Such high power amplifiers can be very expensive and need to be efficient. Efficiency of a power amplifier improves at saturation for maximum output power levels. However, at maximum output power levels, linearity of the power amplifier is reduced. It is therefore preferred to operate the power amplifiers with signals whose maximum possible instantaneous peak amplitude keeps the power amplifier in the linear range. Reducing the peak-to-average power ratio of the signals handled by the power amplifier produces a signal having a higher total average power (the total average power of the signal is given by its peak power divided by the PAPR), thereby keeping the power amplifier efficient and in the linear range.

In order to reduce the PAPR in wireless communication devices, a series of operations are required in digital front-ends to provide signals to the power amplifier with the desired PAPR. These operations include pulse shaping, crest factor reduction, carrier aggregation, interpolation, and require a significant amount of computational resources.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Embodiments of the present invention provide a channelization device for a digital front end which can save processing time by performing certain operations, such as digital upconversion, in the frequency domain instead of in the time domain. Additionally, or alternatively, embodiments of the present invention provide a channelization device for a digital front end which can save processing time by combining certain operations, as will be explained below. Still other embodiments of the present invention alternatively or additionally provide a channelization device for a digital front end which can save processing time by performing crest factor reduction at relatively low sampling rates. Such embodiments will be explained below.

Figure 1:
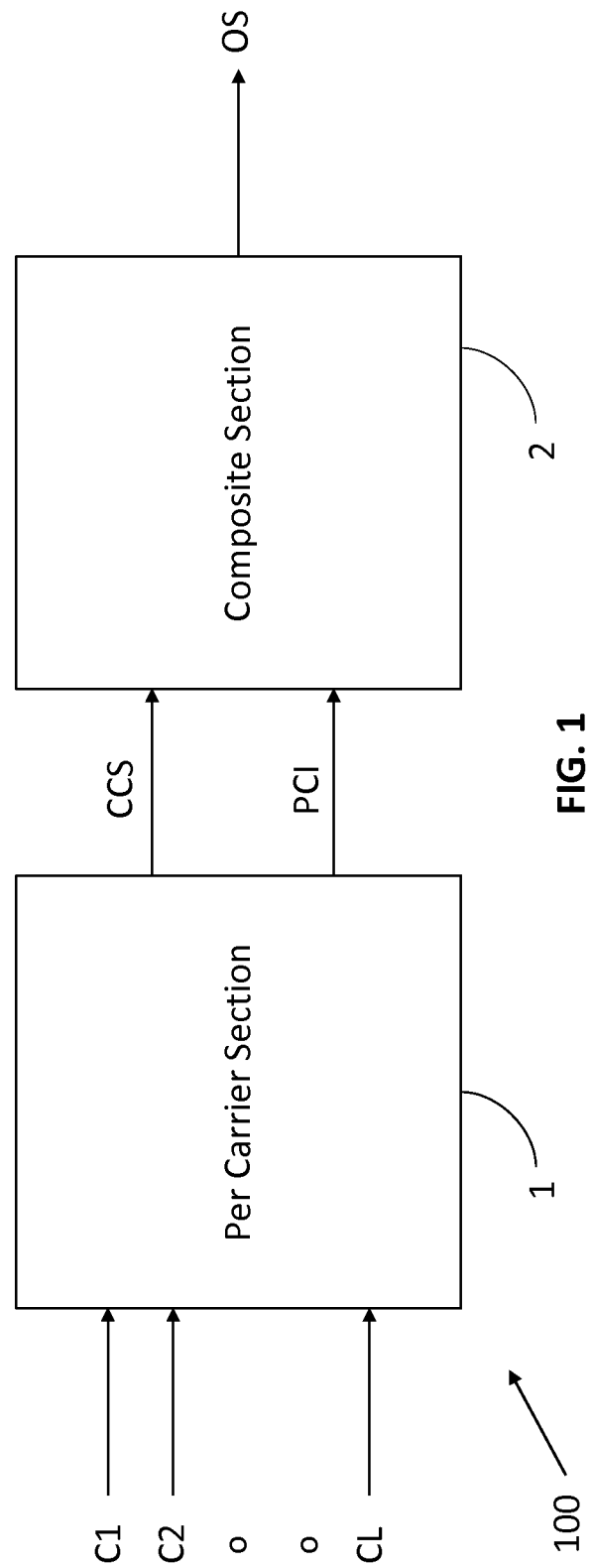
FIG. 1 schematically shows an exemplary embodiment of a digital front end channelization device having two sections.

FIG. 1 schematically shows an example of a digital front end channelization device 100. The digital front end channelization device 100 bridges the processing of one or more carrier signals C1, C2, . . . , CL, e.g. at baseband, and the processing of an output time domain signal OS, e.g. at radio frequency (RF) band.

The digital front end channelization device 100 can include a per carrier section 1 and a composite section 2. The per carrier section 1 processes the one or more carrier signals C1, C2, . . . , CL and outputs a composite carrier signal CCS based on the processed carrier signals, and can as well output per carrier information PCI. The composite section 2 can process the composite carrier signal CCS and any per carrier information PCI to produce an output signal OS.

Figure 2:
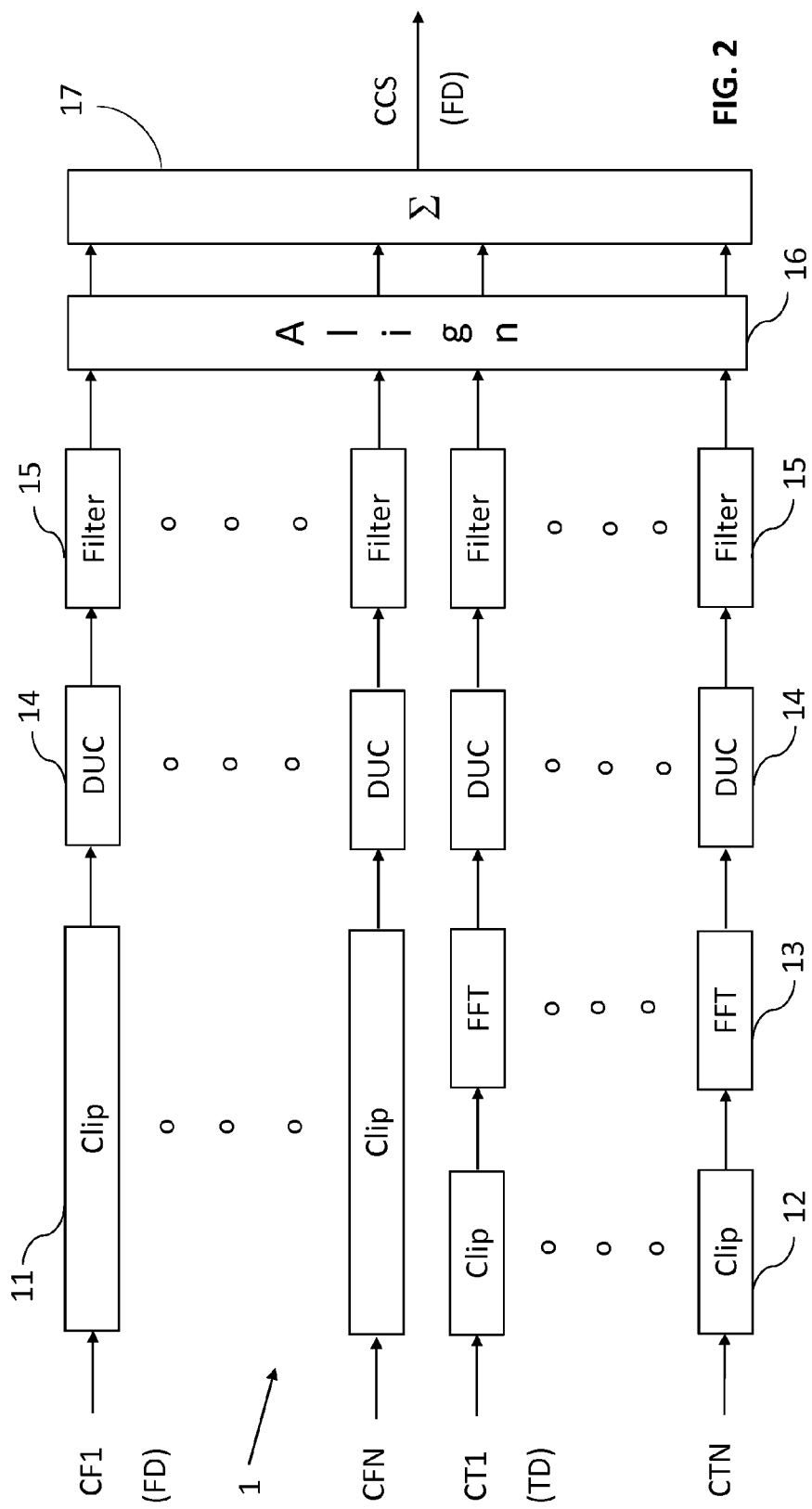
FIG. 2 schematically shows an exemplary embodiment of a first section of a digital front end channelization device.

A merely exemplary embodiment of a per carrier section 1 is illustrated in FIG. 2. The per carrier section 1 of FIG. 2 is configured for receiving N frequency domain (FD) carrier signals CF1 . . . CFN and N time domain (TD) carrier signals CT1 . . . CTN. Each frequency domain carrier signal can be fed to a separate frequency domain clipping unit 11 (which will later be explained in more detail with reference to FIG. 3) while each time domain carrier signal can be fed to a separate time domain clipping unit 12, which can each be followed by a fast Fourier transform (FFT) unit 13 to produce a clipped frequency domain signal. As the frequency domain clipping units 11 produce frequency domain signals, they are not followed by FFT units.

All frequency domain signals can then be fed to upconversion units 14, more in particular digital upconversion (DUC) units which can be configured for upsampling the frequency domain signals so as to produce a greater resolution in the frequency domain. The upconverted signals may subsequently be filtered by frequency domain channel/pulse shape filters 15. An alignment unit 16 can then align the processed carrier signals, for example by adjusting their level, phase, sample delays and/or subsample delays. The aligned carrier signals can then be combined in a summation unit 17 to produce a composite frequency domain carrier signal.

Figure 3:
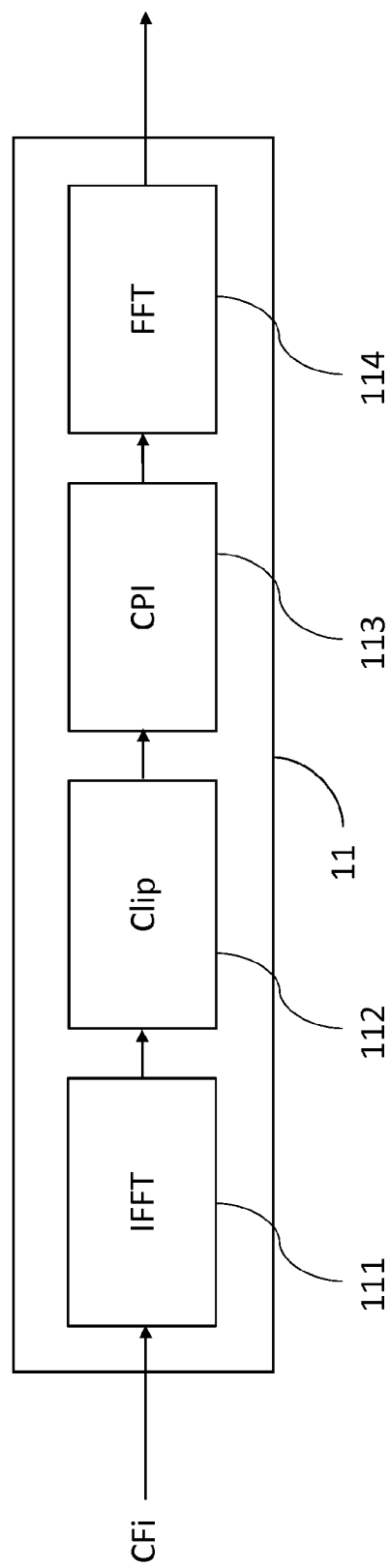
FIG. 3 schematically shows an exemplary embodiment of part of a first section of a digital front end channelization device.

A merely exemplary frequency domain clipping unit 11 is shown in more detail in FIG. 3. The unit 11 of FIG. 3 is shown to include an inverse fast Fourier transform (IFFT) unit 111 configured for transforming the frequency domain carrier signal CFi (=CF1 . . . CFN, see FIG. 2) into the time domain, a time domain clipping unit 112, a cyclic prefix insertion unit 113 and a fast Fourier transform (FFT) unit 114 to produce a clipped frequency domain signal. Although the order of the clipping unit 112 and cyclic prefix insertion unit 113 may be reversed, the order shown in FIG. 3 is more efficient as the peak processing in the clipping block is more efficient when the cyclic prefix has not yet been inserted. It can be seen that the frequency domain clipping block 11 carries out the actual clipping in the time domain.

Figure 4:
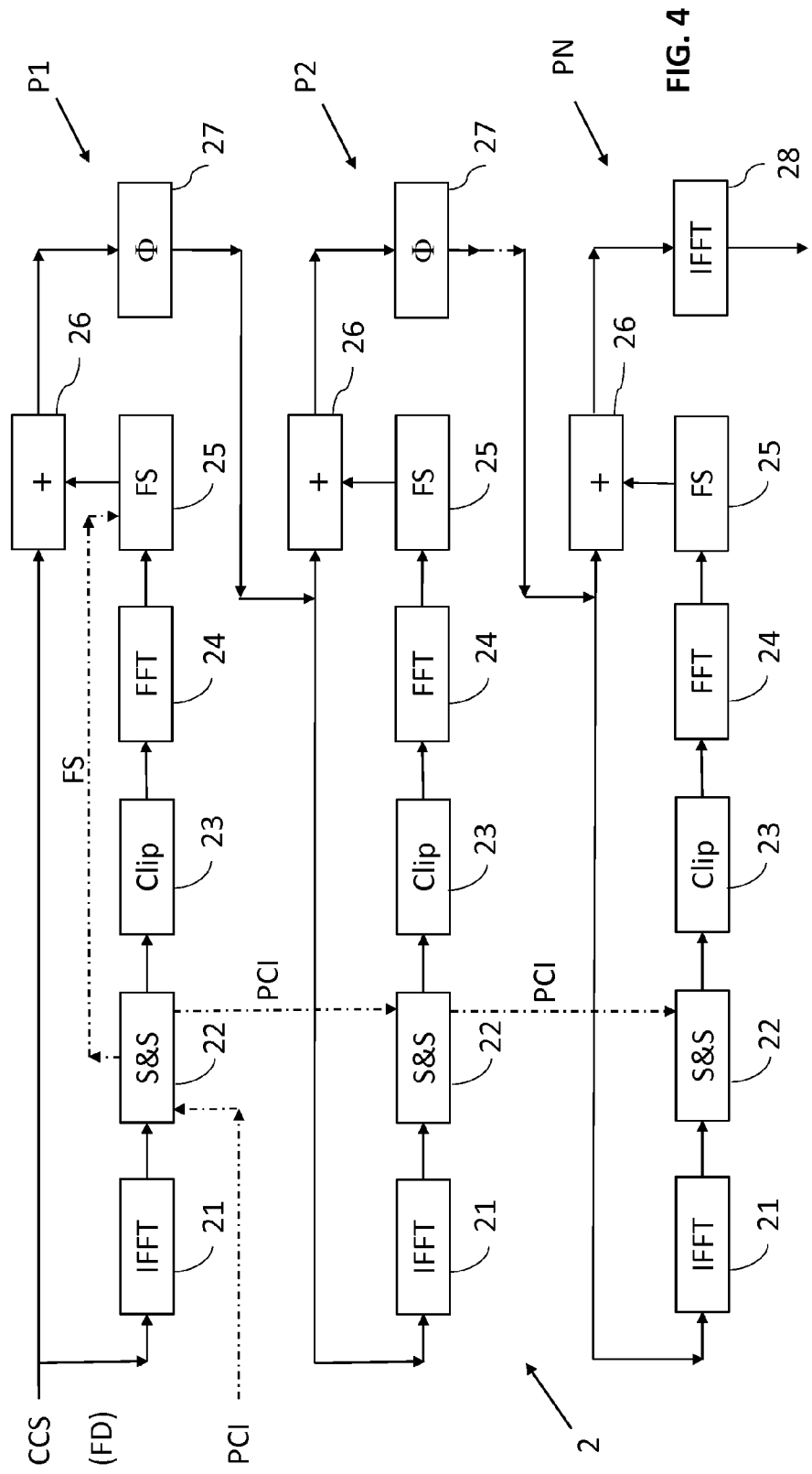
FIG. 4 schematically shows a first exemplary embodiment of a second section of a digital front end channelization device.

The composite section 2 can include a series arrangement of N frequency domain signal processing units P1, P2, . . . , PN, as is schematically illustrated in FIG. 4. The series arrangement can include a first frequency domain signal processing unit P1 and a last frequency domain signal processing unit PN. The series arrangement may include one or more intermediate units. Typically, the series arrangement will include a penultimate frequency domain signal processing unit PN−1. It is noted that in embodiments where N=3, only one intermediate unit will be present and the penultimate unit will be P2. Similarly, in embodiments where N=2, no intermediate unit will be present. In such embodiments, the penultimate unite will be P1, the penultimate unit and the first unit thus being identical.

Each signal processing unit P1, P2, . . . PN can include an inverse fast Fourier Transform (IFFT) unit 21, a sample detection and selection unit 22, a clipping unit 23, a fast Fourier Transform (FFT) unit 24, a frequency shaping unit 25, a summation unit 26 and a phase selection unit 27. The first processing unit P1 is configured for receiving a frequency domain (FD) signal CCS (composite carrier signal, see FIG. 1) at its input. Each processing unit P1 . . . PN is shown to include a signal path leading directly to the summation unit 26, and an error path leading to the summation unit 26 through the sample detection and selection unit 22, the clipping unit 23, the frequency shaping unit 25, and any (forward or inverse) FFT units.

The inverse Fourier transform unit 21 in the error path transforms the frequency domain composite carrier signal CCS into a time domain carrier signal. The sample detection and selection unit 22 dynamically detects and select a peak of the time domain carrier signal when the amplitude has exceeded a predetermined threshold.

The clipping unit 23 can clip the time domain carrier signal based on the selected peak amplitude. The Fourier transform unit 24 can transform the resulting error signal into a frequency domain signal. The frequency shaping unit 25 can distribute the frequency spectrum of the error signal and filter the resulting error signal.

The frequency shaping unit 25 can be placed after the summation node 26. For example, if placed after the summation node 26, i.e. after subtraction, each channel in the channelization device can be filtered to maintain the respective carrier signal bandwidth.

The summation unit 26 subtracts the error signal from the composite carrier signal so as to produce an intermediate signal.

The phase selection unit 27 can adjust the phase ($\Phi$) of the intermediate signal. For example, the phase selection unit 27 may be implemented by using half sample delay, i.e. a sample may be delayed by a frequency span between subsequent original samples. The phase adjustment may be performed using multiplication.

The phase selection unit 27 can be optional and may be used to improve the quality of the intermediate signal, e.g. to obtain a lower Error Vector Magnitude (EVM).

In the last frequency domain signal processing unit PN, the phase selection unit 27 may be replaced with an inverse Fourier transform unit 28 for producing a time domain output signal. The inverse Fourier transform unit 28 can be configured to up-sample the last intermediate signal of the series arrangement of signal processing units P1, P2 and PN to produce a time domain output signal having an increased, for example double or quadruple, sampling rate.

After each signal processing unit P1 . . . PN, the peak-to-average power ratio (PAPR) of the composite carrier signal is typically reduced. Since the channelization device 100 can embed both an interpolation function by increasing the sampling rate and a crest factor reduction function by progressively filtering and clipping the composite carrier signal, computational resources required for its implementation are substantially reduced compared to standard solution wherein both functions are separated and implemented in separated devices.

In one embodiment the sample detection and selection units 22 of the first frequency domain processing unit P1 can be configured to receive information on the one or more carriers signals from the per carrier section 1. This is illustrated in FIG. 4 by dashed lines. The per carrier information PCI can be used by the sample detection and selection unit 22 to detect and select the amplitude of the time domain signal exceeding a predetermined threshold within a predetermined data window.

By detecting and selecting the amplitude within a predetermined data window, the clipping of the time domain signal is enhanced because it may occurs on all peaks within the predetermined data window.

The information received by the sample detection and selection unit 22 can include any parameters of the one or more carrier signals suitable for the specific implementation. For example, for each carrier signal the information can include at least one of a symbol timing, a carrier power, a carrier bandwidth, a carrier intermediate frequency location and carrier intermediate frequency location.

In an embodiment, the sample detection and selection unit 22 of each frequency domain signal processing unit P1 . . . PN can be configured to pass information, for example the per carrier information PCI, to the sample detection and selection unit 22 of the next frequency domain signal processing unit. The information passed on may be the same information as received by the first sample detection and selection unit 22.

In an embodiment, the detection and selection unit 22 is configured to produce frequency range information relating to one or more parts of the composite carrier signal which exceed the threshold, and for supplying said frequency range information to the frequency shaping unit of the same signal processing unit. At least one frequency shaping unit 25 can be configured for frequency shaping in dependence on said frequency range information received from the detection and selection unit 22. The (sample) detection and selection unit 22 can be configured to detect signal samples exceeding a threshold but may mark for clipping only signal samples which satisfy a condition determined by properties of the per carrier signals. Suitable properties may include carrier symbol timing (in Orthogonal Frequency Division Multiplexing systems), carrier power, carrier bandwidth, and/or carrier Intermediate Frequency (IF) locations. As most or all of the power of the clipped signal may be contained in a limited number of frequency bands, the frequency shaping unit 27 may be configured for using frequency range information supplied by the detection and selection unit 22 to produce a suitably shaped frequency domain signal. This frequency range information may be contained in a frequency selection (FS) signal which may include a vector of weights which is multiplied with a static frequency shaping function in the frequency shaping unit. The static frequency shaping function may be selected for a given set of carriers in the composite signal.

Figure 5:
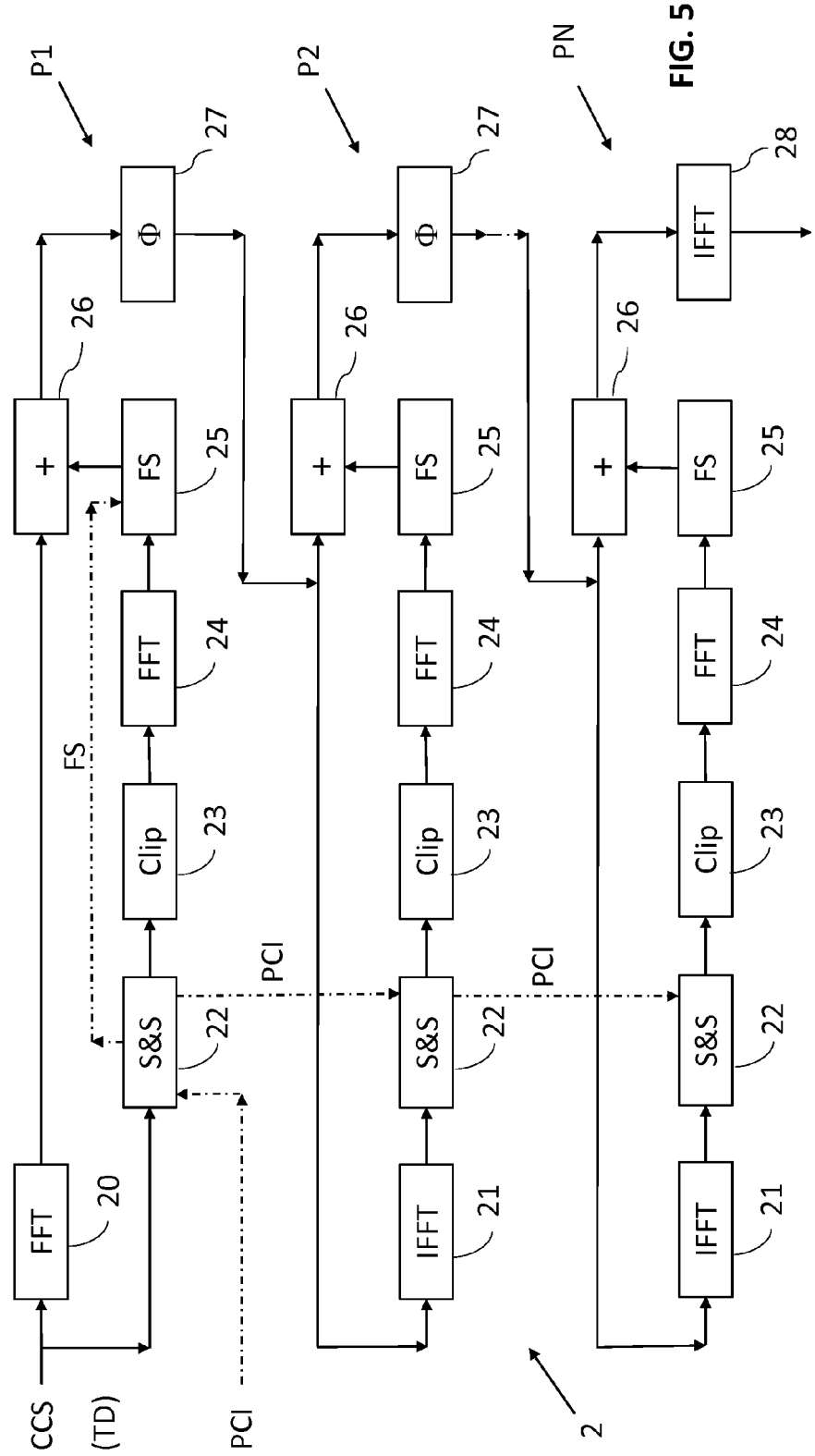
FIG. 5 schematically shows a second exemplary embodiment of a second section of a digital front end channelization device.

FIG. 5 schematically shows an alternative exemplary embodiment of a composite section 2. This embodiment can receive a time domain (TD) composite carrier signal CCS at its input and therefore the inverse fast Fourier transform unit 21 has been omitted in the first signal processing unit P1. Instead, a (forward) fast Fourier transform unit 20 has been inserted between the input and the summation unit 26, in the signal path. The other signal processing units P2 . . . PN can be identical to those illustrated in FIG. 4.

Although the units P1 . . . PN in FIGS. 4 and 5 have been explained as signal processing units, which may be implemented as hardware units, the units P1 . . . PN may equally well be implemented in software. In a software embodiment, the items referred to as units P1 . . . PN may be referred to as passes P1 . . . PN. These passes can be part of an iterative method.

Embodiments of a digital front end channelization device in accordance with the present invention can be envisaged which involve a field-programmable gate array (FPGA). Other embodiments can be envisaged which involve an integrated circuit having a processor and an associated memory. Still other embodiments can be envisaged which involve a non-programmable integrated circuit.

In an embodiment, a digital front end channelization device for one or more carrier signals is provided, the device including a per carrier section and a composite section, the per carrier section being configured to process the one or more carrier signals so as to output a frequency domain composite carrier signal, and the composite section including a series arrangement of frequency domain signal processing units. The series arrangement can include a first unit, a penultimate unit and a last unit. In this series arrangement, each signal processing unit can include an inverse Fourier transform unit configured for transforming the frequency domain composite carrier signal into a time domain composite carrier signal, a sample detection and selection unit configured for dynamically detecting and selecting a peak of the time domain composite carrier signal when the amplitude of the time domain composite carrier signal has exceeded a predetermined threshold, a clipping unit configured for clipping the time domain composite carrier signal based on the amplitude of the selected peak so as to produce an error signal, a Fourier transform unit configured for transforming the error signal into a frequency domain error signal, a frequency shaping unit configured for frequency shaping the error signal, and a summation unit configured for subtracting a frequency shaped error signal from the composite carrier signal so as to produce an intermediate signal. The first to penultimate unit can further include a phase selection unit configured for phase adjustment of the intermediate signal, the last unit including an inverse Fourier transform unit configured for producing a time domain output signal, which inverse Fourier transform unit is configured for upsampling the intermediate signal.

In another embodiment, each signal processing unit of the digital front end channelization device can include a Fourier transform unit configured to transform the time domain composite carrier signal into a frequency domain carrier signal, instead of an inverse Fourier transform unit configured to transform the frequency domain composite carrier signal into a time domain composite carrier signal. This allows the signal processing units to receive and process time domain signals instead of frequency domain signals.

In another embodiment, a method of processing signals in a digital front end channelization device configured to receive one or more carrier signals is provided, wherein the device includes a per carrier section and a composite section, the per carrier section being configured to process the one or more carrier signals so as to output a frequency domain composite carrier signal, and wherein the composite section can be configured for frequency domain signal processing in a number of passes. The number of passes can include a first pass, a penultimate pass and a last pass, each pass including inverse Fourier transforming the frequency domain composite carrier signal into a time domain composite carrier signal, dynamically detecting and selecting a peak of the time domain composite carrier signal when the amplitude of the time domain composite carrier signal has exceeded a predetermined threshold, clipping the time domain composite carrier signal based on the amplitude of the selected peak so as to produce an error signal, Fourier transforming the error signal into a frequency domain error signal, frequency shaping the frequency domain error signal, subtracting a frequency shaped error signal from the composite carrier signal so as to produce an intermediate signal, and the first to the penultimate pass further including phase selection for phase adjustment of the intermediate signal. The last pass can include an inverse Fourier transform for producing a time domain output signal, which inverse Fourier transform is configured for upsampling the intermediate signal.

In the foregoing specification, the invention has been described with reference to specific examples of embodiments of the invention. It will, however, be evident that various modifications and changes may be made therein without departing from the scope of the invention as set forth in the appended claims.

The connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The invention may also be implemented in a computer program for running on a computer system at least including code portions for performing steps of a method according to the invention when run on a programmable apparatus, such as a computer system or enabling a programmable apparatus to perform functions of a device or system according to the invention. The term "program," as used herein, is defined as a sequence of instructions designed for execution on a computer system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

Furthermore, although the figures and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

A computer system processes information according to a program and produces resultant output information via I/O (Input/Output) devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A digital front end channelization device for one or more carrier signals, the device comprising:
   a per carrier section configured to process the one or more carrier signals and to output a frequency domain composite carrier signal;
   a composite section coupled to the per carrier section and comprising a series arrangement of frequency domain signal processing units, wherein
   the series arrangement comprises a first unit, a last unit, and optionally one or more intermediate units, each unit comprises
   an inverse Fourier transform unit configured to transform the frequency domain composite carrier signal into a time domain composite carrier signal,
   a sample detection and selection unit configured to dynamically detect and select a peak of the time domain composite carrier signal when an amplitude of the time domain composite carrier signal has exceeded a predetermined threshold,
   a clipping unit configured to clip the time domain composite carrier signal based on the amplitude of the selected peak so as to produce an error signal,
   a Fourier transform unit configured to transform the error signal into a frequency domain error signal, a frequency shaping unit configured to frequency shape the frequency domain error signal, and a summation unit configured to subtract a frequency shaped error signal from the composite carrier signal so as to produce an intermediate signal, and the first unit and any intermediate unit further comprises a phase selection unit configured to phase adjust the intermediate signal, and the last unit comprises an inverse Fourier transform unit configured to produce a time domain output signal, and to upsample the intermediate signal.

2. The digital front end channelization device according to claim 1, wherein the sample detection and selection unit of the first unit is configured to receive information on the one or more carrier signals from the per carrier section for detecting and selecting the amplitude of the time domain signal within a predetermined data window.

3. The digital front end channelization device according to claim 2, wherein the sample detection and selection unit of at least the first unit is configured to pass the information to the sample detection and selection unit of a next unit of the series arrangement.

4. The digital front end channelization device according to claim 2, wherein the information comprises for each of the one or more carrier signals at least one of:
a symbol timing,
a carrier power,
a carrier bandwidth, and
a carrier intermediate frequency location.

5. The digital front end channelization device according to claim 1, wherein the sample detection and selection unit of at least one signal processing unit is configured to produce frequency range information relating to a part of the composite carrier signal exceeding the threshold, and for supplying said frequency range information to the frequency shaping unit of the same signal processing unit; and wherein at least one frequency shaping unit is configured to frequency shape in dependence on said frequency range information.

6. The digital front end channelization device according to claim 1, wherein the per carrier section further comprises:
a clipping and prefix unit for one or more of the carrier signals wherein the clipping and prefix unit comprises
an inverse Fourier transform unit configured to produce a time domain carrier signal;
a time domain clipping unit configured to clip the time domain signal;
a cyclic prefix insertion unit configured to insert a cyclic prefix in the clipped time domain carrier signal; and
a Fourier transform unit configured to produce a frequency domain clipped carrier signal.

7. The digital front end channelization device according to claim 6, wherein the per carrier section further comprises:
an alignment unit configured to upsample the frequency domain clipped carrier signal to a predetermined number of samples associated to a respective one or more carrier signals;
a filtering unit configured to filter the upsampled signal in the frequency domain;
a frequency shifting unit configured to shift the frequency of the filtered signal; and
a phase shifting unit configured to delay the samples associated with the respective one or more carrier signals and to output an aligned processed carrier signal.

8. The digital front end channelization device according to claim 6, wherein the per carrier section further comprises a carrier summation unit configured to produce the composite carrier signal as a summation of the aligned processed carrier signals.

9. A digital front end channelization device for one or more carrier signals, the device comprising:
a per carrier section configured to process the one or more carrier signals so as to output a time domain composite carrier signal;
a composite section coupled to the per carrier section and comprising a series arrangement of frequency domain signal processing units, wherein
the series arrangement comprises a first unit, a last unit, and optionally one or more intermediate units, each unit comprises
a sample detection and selection unit configured to dynamically detect and select a peak of the time domain composite carrier signal when an amplitude of the time domain composite carrier signal has exceeded a predetermined threshold,
a clipping unit configured to clip the time domain composite carrier signal based on the amplitude of the selected peak so as to produce an error signal,
a Fourier transform unit configured to transform the error signal into a frequency domain error signal,
a frequency shaping unit configured to frequency shape the frequency domain error signal,
a Fourier transform unit configured to transform the time domain composite carrier signal into a frequency domain carrier signal,
a summation unit configured to subtract a shaped signal from the composite carrier signal so as to produce an intermediate signal, and
the first unit and any intermediate unit further comprises
a phase selection unit configured to phase adjust the intermediate signal, and
the last unit comprises an inverse Fourier transform unit configured to produce a time domain output signal, and upsample the intermediate signal.

10. The digital front end channelization device according to claim 9, wherein the sample detection and selection unit of the first unit is configured to receive information of the one or more carrier signals from the per carrier section for detecting and selecting the amplitude of the time domain signal within a predetermined data window.

11. The digital front end channelization device according to claim 10, wherein the sample detection and selection unit of at least the first unit is configured to pass the information to the sample detection and selection unit of a next unit of the series arrangement.

12. The digital front end channelization device according to claim 10, wherein the information comprises for each of the one or more carrier signals at least one of:
a symbol timing,
a carrier power,
a carrier bandwidth, and
a carrier intermediate frequency location.

13. The digital front end channelization device according to claim 9, wherein the sample detection and selection unit of at least one signal processing unit is configured to produce frequency range information relating to a part of the composite carrier signal exceeding the threshold, and for supplying said frequency range information to the frequency shaping unit of the same signal processing unit; and wherein at least one frequency shaping unit is configured to frequency shape in dependence on said frequency range information.

14. The digital front end channelization device according to claim 9, wherein the per carrier section further comprises for one or more of the carrier signals a clipping and prefix unit, which clipping and prefix unit comprises:
    an inverse Fourier transform unit configured to produce a time domain carrier signal,
    a time domain clipping unit configured to clip the time domain signal,
    a cyclic prefix insertion unit configured to insert a cyclic prefix in the clipped time domain carrier signal, and
    a Fourier transform unit configured to produce a frequency domain clipped carrier signal.

15. The digital front end channelization device according to claim 14, wherein the per carrier section further comprises:
    an alignment unit configured to upsample the frequency domain clipped carrier signal to a predetermined number of samples associated to a respective one or more carrier signals,
    a filtering unit configured to filter the upsampled signal in the frequency domain,
    a frequency shifting unit configured to shift the frequency of the filtered signal,
    a phase shifting unit configured to delay the samples associated with the respective one or more carrier signals and to output an aligned processed carrier signal.

16. The digital front end channelization device according to claim 14, wherein the per carrier section further comprises a carrier summation unit configured to produce the composite carrier signal as a summation of the aligned processed carrier signals.

* * * * *